(12) United States Patent
Okada et al.

(10) Patent No.: US 9,312,538 B2
(45) Date of Patent: Apr. 12, 2016

(54) METHOD FOR PRODUCING IRON OXYFLUORIDE POSITIVE ELECTRODE ACTIVE SUBSTANCE AND IRON OXYFLOURIDE POSITIVE ELECTRODE ACTIVE SUBSTANCE

(75) Inventors: Shigeto Okada, Fukuoka (JP); Ayuko Kitajou, Fukuoka (JP); Hideyuki Komatsu, Fukuoka (JP); Irina D. Gocheva, Fukuoka (JP); Kuniko Chihara, Fukuoka (JP); Junichi Yamaki, Fukuoka (JP)

(73) Assignee: Kyushu University, National University Corporation, Fukuoka (JP)

( * ) Notice: Subject to any disclaimer, the term of this patent is extended or adjusted under 35 U.S.C. 154(b) by 86 days.

(21) Appl. No.: 14/128,470

(22) PCT Filed: Jun. 22, 2012

(86) PCT No.: PCT/JP2012/066071
§ 371 (c)(1),
(2), (4) Date: Mar. 31, 2014

(87) PCT Pub. No.: WO2012/176907
PCT Pub. Date: Dec. 27, 2012

(65) Prior Publication Data
US 2014/0291573 A1 Oct. 2, 2014

(30) Foreign Application Priority Data

Jun. 22, 2011 (JP) ................................. 2011-138850

(51) Int. Cl.
*H01M 4/36* (2006.01)
*C01B 11/24* (2006.01)
(Continued)

(52) U.S. Cl.
CPC ............... *H01M 4/364* (2013.01); *C01B 11/24* (2013.01); *C01G 49/00* (2013.01);
(Continued)

(58) Field of Classification Search
CPC ...................................................... C01B 11/24
See application file for complete search history.

(56) References Cited

U.S. PATENT DOCUMENTS 3,365,269 A * 1/1968 Chamberland ............... 423/464

FOREIGN PATENT DOCUMENTS

| JP | 09-055200 | 2/1997 |
|----|-----------|--------|
| WO | WO 2009/143324 A1 | 11/2009 |
| WO | WO 2010/114104 A1 | 10/2010 |

OTHER PUBLICATIONS

Rapoport et al., "Introduction to Theory and Industrial Application of Induction Heating Processes," Chapter 1 of Optimal Control of Induction Heating Processes, pp. 1-34 and title pages, copyright 2007 to the Taylor & Francis Group, LLC.*

(Continued)

*Primary Examiner* — Mark Kopec
*Assistant Examiner* — Katie L Hammer
(74) *Attorney, Agent, or Firm* — Fay Sharpe LLP

(57) ABSTRACT

Provided is a technology for producing a positive electrode active substance mainly composed of FeOF having a sufficient charge-discharge capacity, in the short-time and easy manner. Also provided is a positive electrode active substance mainly composed of FeOF. The method for producing the positive electrode active substance mainly composed of FeOF comprises the steps of admixing iron oxide $Fe_2O_3$ and iron fluoride $FeF_3$ both in solid states, and melt-quenching the mixture in an atmosphere of inert gas. The positive electrode active substance mainly composed of FeOF is composed of not less than 50% by weight of FeOF with a remainder being iron fluoride $FeF_3$ and/or iron oxide $Fe_2O_3$.

11 Claims, 5 Drawing Sheets

(51) Int. Cl.
*C01G 49/00* (2006.01)
*H01M 4/52* (2010.01)
*C01G 49/06* (2006.01)
*C01G 49/10* (2006.01)

(52) U.S. Cl.
CPC ........... *C01G 49/0018* (2013.01); *C01G 49/06* (2013.01); *C01G 49/10* (2013.01); *H01M 4/523* (2013.01); *C01P 2002/72* (2013.01); *C01P 2002/74* (2013.01); *C01P 2006/40* (2013.01)

(56) References Cited

OTHER PUBLICATIONS

Badway, F. et al., "Carbon Metal Fluoride Nanocomposites—High-Capacity Reversible Metal Fluoride Conversion Materials as Rechargeable Positive Electrodes for Li Batteries", Journal of the Electrochemical Society, 150 (10) (2003) A1318-A1327.

Liu, H. et al., "Electrochemical Performance of $\alpha$-Fed$_2$O$_3$ Nanorods as Anode Material for Lithium-ion Cells", Electrochimica Acta, 54 (2009) 1733-1736.

Recham, N. et al., "Novel Synthesis and Electrochemical Behaviour vs. Lie of the First Ever Reported Lamellar FeOF Phase", ECS Meeting Abstracts, 802 (2008) 594.

Pereira, N. et al., "Iron Oxyfluorides as High Capacity Cathode Materials for Lithium Batteries", Journal of the Electrochemical Society 156(6) (2009) A407-A416.

Vlasse, M. et al., "The Refinement of the Crystal Structure of Iron Oxyfluoride, FeOF", Journal of Solid State Chemistry, 2(8) (1973) 109-113.

International Search Report of International Application No. PCT/JP2012/066071 dated Jul. 31, 2012.

Brink, et al., "An Electron Diffraction and Crystal Chemical Investigation of Oxygen/Fluorine Ordering in Rutile-Type Iron Oxyfluoride, FeOF," Journal of Solid State Chemistry, vol. 155, No. 2, pp. 359-365 (2000).

* cited by examiner (a)

(b)

(a)

(b)

(a) FeO : FeF(Molar Ratio)=1 : 1.86, 1 : 2.13, 1 : 2.33

(b) $Fe_2O_3$ : $FeF_3$(Molar Ratio)=1 : 10

(c) $Fe_2O_3$ : $FeF_3$(Molar Ratio)=1 : 2.33

US 9,312,538 B2

METHOD FOR PRODUCING IRON OXYFLUORIDE POSITIVE ELECTRODE ACTIVE SUBSTANCE AND IRON OXYFLOURIDE POSITIVE ELECTRODE ACTIVE SUBSTANCE

TECHNICAL FIELD

The present invention belongs to the technical field of nonaqueous electrolyte secondary cell (battery) and, particularly relates to a novel method for producing a positive electrode active substance in a less-costly and efficient manner and a novel positive electrode active substance.

Recently developments in lithium ion cells with a high capacity and economic advantages have been desired for applications in power sources in electric vehicles, smart grids and so on. Under the circumstances, extensive studies have been made on nonaqueous electrolyte secondary cells using a nonaqueous electrolytic solution (an electrolytic solution of an electrolyte dissolved in a nonaqueous solvent such as an organic solvent) as secondary cells, in anticipation of concurrently achieving a high voltage and energy density As positive electrodes for nonaqueous secondary cells, there have been widely utilized positive electrode active substances composed of fluorides or oxides. For example, iron-based, low-cost and safe $FeF_3$ (cf. non-patent reference No. 1) and $Fe_2O_3$ (cf. non-patent reference No. 2) have been proposed as positive electrode active substances for lithium ion secondary cells.

$FeF_3$ has a high average discharge voltage of approx. 1.7 V against lithium negative electrode and exhibits a theoretical capacity of 712 mAh/g (a theoretical energy density of 1210 mWh/g) based on three-electron reaction. On the other hand, $Fe_2O_3$ has an average discharge voltage of 1 V at most, but it exhibits a theoretical capacity of as high as 1007 mAh/g (a theoretical energy density of 1006 mWh/g) based on six-electron reaction. As compared with $FeF_3$ and $Fe_2O_3$, while FeOF has intermediate values of an average discharge voltage of approx. 1.4V and a theoretical capacity of 885 mAh/g based on three electron reaction, it exhibits the highest value of 1239 mWh/g in the integrated value of average discharge voltage and theoretical capacity which signifies utilizable energy density. Accordingly, as an interesting positive electrode active substance making use of such characteristics, attention has focused on a positive electrode active substance composed of FeOF, an iron compound based on oxyfluoride, which contains fluorine element and oxygen element.

As positive electrode active substances composed of oxyfluoride-based ion compound, there are known some containing lithium element (e.g. Patent Reference No. 1), but examples of positive electrode active substance composed of FeOF are few. In particular, there have been no reports of FeOF being synthesized by means of solid phase calcination. This is because the synthesis of FeOF by means of solid phase calcination as conventionally conducted may lead to damage of the furnace and of FeOF itself as well. No positive electrode active substances for nonaqueous electrolyte secondary cell are found composed of FeOF, which exhibits excellent charge and discharge characteristics. As alternative methods to the solid phase calcination for producing FeOF, there have been proposed, for example, an ion exchange method in which the chlorine element in FeOCl is replaced with fluorine element (cf. Non-patent Reference No. 3), and a thermal decomposition method in which a silicon-containing compound ($FeSiF_6.6H_2O$) is thermally decomposed (cf. Non-patent Reference No. 4). A method is also found in which single crystal of FeOF is produced at high temperatures and pressures (cf. Non-patent Reference No. 5).

PRIOR ART REFERENCES

Patent References

Patent Reference No. 1: Japanese Patent Application Publication No. 2009-64707

Non-Patent References

Non-patent Reference No. 1: F. Badway, F. Cosandey, N. Pereira, and G. G. Amatucci, *Journal of The Electrochemical Society*, 150(10) (2003) A1318-A1327.

Non-patent Reference No. 2: H. Liu, G. Wang, J. Park, J. Wang, H. Liu, and C. Zhang, *Electrochimica Acta*, 54 (2009) 1733-1736.

Non-patent Reference No. 3: N. Recham, L. Laffont-Dantras, M. Armand, and J.-M. Tarascon, ECS Meeting Abstracts, 802, (2008) 594.

Non-patent Reference No. 4: N. Pereira, F. B adway, M. Wartelsky, S. Gunn, and G. G. Amatucci, *Journal of The Electrochemical Society*, 156(6) (2009) A407-A416.

Non-patent Reference No. 5: M. Vlasse, J. C. Massies, and G. Demazeau, *Journal of Solid State Chemistry*, 2(8) (1973) 109-113.

SUMMARY OF THE INVENTION

Problems to be Solved by the Invention

Production of FeOF as a positive electrode active substance by the ion-exchange method (non-patent reference No. 3) suffers from a drawback that a prolonged synthesis, as long as ten hours or more, is needed, resulting in a high cost of production. In addition, the resulting synthetic product may contain impurities due to the starting material LiFeOCl and is composed of a distorted rutile phase ($a \approx b \approx 4.65$ Å, $c=3.046$ Å). Such possible impurities will degrade electrode performance, resulting in an electrochemical characteristic value of about 2.5V (against $Li^+:Li^0$), which is 80% of the theoretical capacity at the utmost.

Production of FeOF as a positive electrode active substance by the thermal decomposition method (non-patent reference No. 4) is also disadvantageous in that it needs a prolonged time for synthesis, as long as ten hours or more, leading to a high cost of production. Furthermore, the resultant synthetic compound is not pure FeOF, but one in which the composition ratio of oxygen and fluorine atoms is inconsistent and the oxyfluoride is expressed by $FeO_xF_{2-x}$ (where $0<x<1$). The starting material $FeSiF_6$ may contaminate the synthetic product as impurity, thus degrading the electrode performance. This can be seen, for example, from FIG. 6 of non-patent reference No. 4, which illustrates experimental results on discharge capacity as a function of cycle number versus Li metal between 1.5 and 4.5 V at 60° C. under a constant current of 50 mA/g. Even in the case where the product of the general formula $FeO_xF_{2-x}$ may be the nearest to pure FeOF (annealed at 250° C. for 8 hours, with $C=3.03$ Å), the discharge capacity is 380 mAh/g at the most in the first cycle and, what is more, the discharge capacity decreases with increasing cycle number. Such deterioration in the electrode performance may be due to the possibly remaining $FeSiF_6$ as an impurity.

In producing FeOF at high temperatures and pressures (Non-patent Reference No. 5), iron oxide $Fe_2O_3$ and iron fluoride $FeF_3$ are utilized as the starting materials. This process requires an extremely high pressure of up to 6 GPa (60 kbar) in order to protect against the volatilization of fluorine gas derived from the fluorine atom contained in the starting material, thus making the process inappropriate for mass-production. Furthermore, this process is dedicated to the production of FeOF as single crystal. No mention is made as to whether the single crystal of FeOF may be utilized as a positive electrode active substance for nonaqueous electrolyte secondary cells, so that no supporting data are found regarding the cell characteristics as positive electrode active substance.

The present invention is proposed to overcome the above-mentioned problems and provides a process for producing a positive electrode active substance mainly composed of FeOF exhibiting a satisfactory charge/discharge capacity, in a time-saving and an easy manner as compared with the conventional methods, and further provides such positive electrode substance mainly composed of FeOF.

Means for Solving the Problems

After extensive studies, the present inventors have invented a method for producing a positive electrode active substance mainly composed of FeOF, and a novel positive electrode active substance which is mainly composed of FeOF, which is suitable for use in a nonaqueous electrolyte secondary cell. The present inventors have also found that it is possible to construct a nonaqueous electrolyte secondary cell with high operational stability by combining the positive electrode active substance mainly composed of FeOF with an appropriate negative electrode active substance.

Thus, according to the present invention, there is provided a method for producing a positive electrode active substance mainly composed of FeOF, which comprises admixing iron oxide $Fe_2O_3$ and iron fluoride $FeF_3$ both in solid states and then melt-quenching the resultant mixture in an atmosphere of inert gas. According to the present invention there is also provided a positive electrode active substance mainly composed of FeOF, in which FeOF is not less than 50% by weight with the remaining being iron fluoride $FeF_3$ and/or iron oxide $Fe_2O_3$.

MODE FOR CARRYING OUT THE INVENTION

According to the present invention, there can be produced a positive electrode active substance mainly composed of FeOF by admixing iron oxide and iron fluoride both in the solid states and then melt-quenching the resultant in an atmosphere of inert gas. More specifically, by means of admixing the iron oxide and the iron oxide as the starting materials followed by the melt-quenching in an inert atmosphere, the fluorine atoms will be combined with the iron oxide in the solid state as much as possible, thereby producing the desired positive electrode active substance FeOF containing oxygen and fluorine atoms.

Thus, the melt-quenching in an atmosphere of inert gas makes iron fluoride, which includes volatile fluorine atom, bind with iron oxide under solid condition to produce the targeted positive electrode active substance FeOF containing oxygen and fluorine atoms.

The present invention produces the desired positive electrode active substance by a melt-quenching process: The starting iron oxide and iron fluoride are admixed in molten states, followed by a cooling operation as quickly as possible so as to prevent the volatilization of the constituents (particularly, fluorine atom) for obtaining the desired product mainly composed of FeOF. Such melt-quenching process can be made up of any combination of a variety of conventionally known melting or heating process and quenching or rapid-cooling process.

For example, the melting process includes any known melting such as high-frequency induction heating, electric arc melting or the like. An example of the quenching process includes any known quenching such as roll quenching, atomization quenching, splat quenching or the like. While high-frequency induction heating/roll quenching is most preferably employed in carrying out the present invention, any combination of known melting process and quenching process as mentioned above can be employed.

For example, in the case where high-frequency induction heating/single-roll quenching is employed, the starting materials placed in a reaction vessel are melted by means of the induction coil, and then the melted materials are quenched by being jetted onto the surface of the single-roll, resulting in the desired product. The heating temperature will suffice provided that iron oxide as the starting material is melted (e.g. 1300° C.). In the melt-quenching, according to the present invention, the quenching treatment is carried out as rapidly as possible so as to enhance the purity of product, particularly by suppressing the elimination of fluorine atoms volatilized from the starting metallic material. Thus, according to the present invention it is possible to produce the product mainly composed of FeOF in an extremely short time, generally within one minutes, for example, forty seconds.

Figure 1:
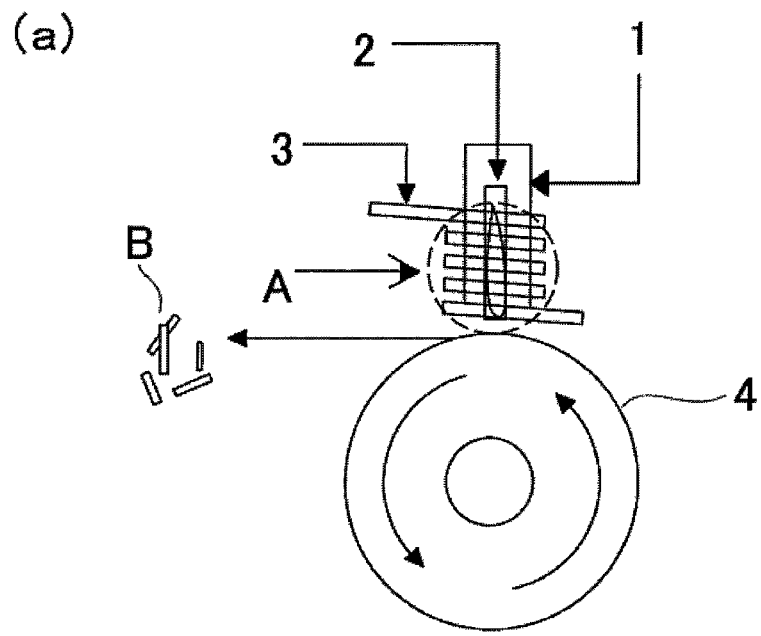
FIG. 1 illustrates the high-frequency induction heating/single-roll quenching apparatus, the pellet electrode, and the coated electrode, according to the present invention.
Figure 1:
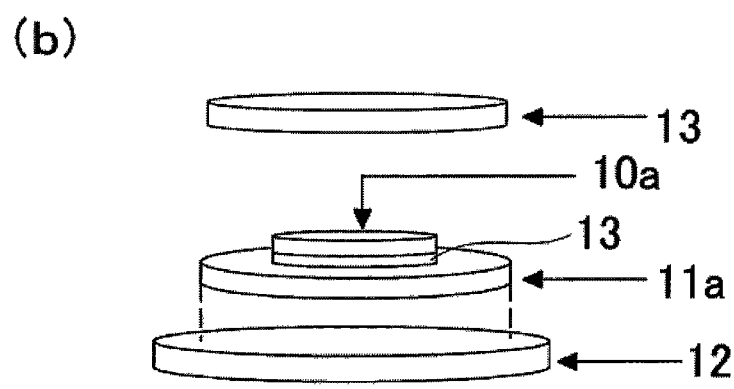
Figure 1:
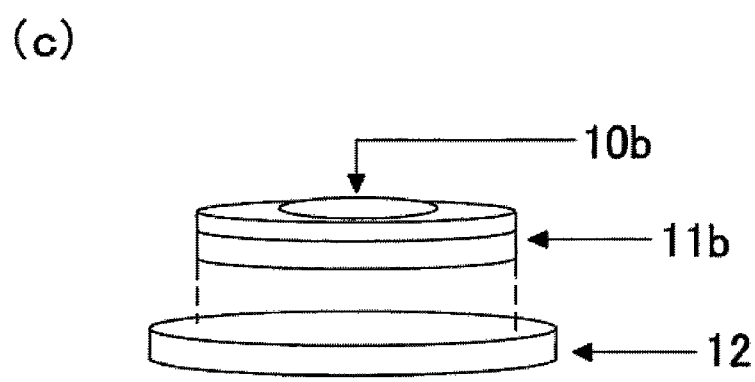

FIG. 1(a) illustrates an example of high-frequency induction heating/single-roll apparatus for use in the present invention, which comprises a quartz tube 1, a crucible 2 with a bottom hole placed within the quartz tube 1, a copper wire 3 coiled around the quartz tube, and a copper roll 4 functioning as a solid cooling medium.

The starting metallic materials are charged into the crucible 2 with the bottom hole within the quartz tube 1. The starting materials are induction-heated by the copper wire coil 3 and fall out through the bottom hole of the crucible, as shown by A in the figure. The starting materials as induction-heated turn into a product sample in the form of vitreous ribbons B when quenched by contact with the copper roll 4, which functions as a water-cooled roll.

The melt-quenching process according to the present invention is conducted in an atmosphere of an inert gas such as nitrogen gas or argon gas, argon gas being preferably used because of the ease of handling.

The conditions of melt-quenching including processing time, rotation speed of the water-cooled roll (the copper roll), induction-heating speed, quenching speed and other factors, may be decided through the analysis and identification of product by XRD and other appropriate measures to see if there are produced the crystals of the desired positive electrode active substance as much as possible with minimum impurities.

It is considered that FeOF, a key ingredient of the positive electrode active substance for nonaqueous electrolyte secondary cell, is produced by the following reaction scheme.

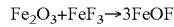  [Chemical Formula 1]

Thus, according to the present invention, FeOF can be obtained even by rendering the ratio between iron fluoride $FeF_3$ and iron oxide $Fe_2O_3$ in the starting materials to be stoichiometric equimolar). However, in view of the fact that fluorine atoms tend to be eliminated by volatilization from the iron fluoride during the melt-quenching process, the ratio between the iron fluoride and the iron oxide is preferably set in such way that fluorine is in excess of the stoichiometric ratio. Such ratio depends upon the types of melting (heating), quenching and the experimental conditions of the operations. For example, in the Working Examples described later where the melt-quenching is carried out by means of high-frequency induction heating/single-roll quenching, the molar ratio of the iron fluoride to the iron oxide (iron fluoride/iron oxide) is preferably 1 (stoichiometric ratio) or more and 10 or less. There is observed a tendency of excessive iron fluoride introduction lowering the initial discharge capacity of the resultant positive electrode active substance.

The present invention also provides a positive electrode active substance mainly composed of FeOF, which can be produced by the above-mentioned method. The present inventors have found that the product mainly composed of FeOF, i.e. the product containing not less than 50% by weight of FeOF, will serve as a positive electrode active substance for nonaqueous electrolyte secondary cell exhibiting sufficient cell characteristics, even though the remainder consists of iron fluoride ($FeF_3$) and/or iron oxide ($Fe_2O_3$). As touched upon previously, the greater the FeOF content in the product is, the more excellent is the cell characteristic because of increased energy density available to the cell. Thus, the FeOF content is preferably not less than 60% by weight, and even a product whose content is not 100% by weight will achieve a positive electrode active substance exhibiting an excellent cell characteristic. The present invention therefore provides a positive electrode active substance composed of FeOF in an amount of not less than 50% by weight, preferably not less than 60% by weight, and not more than 99% by weight, preferably not more than 96% by weight, with the remainder being $FeF_3$ and/or $Fe_2O_3$.

The positive electrode active substance mainly composed of FeOF according to the present invention is further characterized in that the diffraction peak height ratio of (110) plane to (101) plane of FeOF, as measured by the X-ray diffraction method using CuKα ray, is not less than 2, preferably not less than 2 and not more than 20, and more preferably not less than 2 and not more than 10.

The positive electrode active substance mainly composed of FeOF according to the present invention as described above has revealed an initial discharge capacity even as high as 900 mAh/g, which is substantially comparable to the theoretical discharge capacity (cf. Working Examples described later).

While the positive electrode active substance may be utilized as it is as a positive electrode for nonaqueous electrolyte secondary cell, it may be also utilized in the form of a complex with a known electric conductive material so as to improve the rate characteristic of the resultant cell.

More specifically, the positive electrode active substance mainly composed of FeOF according to the present invention may be carbon-coated by pulverizing and admixing it with carbon particulates in an atmosphere of inert gas for improving the rate characteristics. Examples of the carbon particulates include furnace black, channel black, acetylene black, thermal black and the like, among which acetylene black is the most suitable for use in an electrode because of its high conductivity. Examples of inert gas include nitrogen gas and argon gas, with argon gas being preferably employed.

While the specific means used for the pulverization and admixing in the carbon coating is not particularly limited and a variety of conventional techniques known for pulverizing and admixing solid materials may be employed, ball milling is preferable, and planetary ball milling is particularly preferable, for sufficiently pulverizing and admixing the starting materials.

According to the present invention, there are provided a positive electrode active substance mainly composed of FeOF for nonaqueous electrolyte secondary cell, a secondary cell positive electrode containing said positive electrode active substance, and a secondary cell comprising said positive electrode in combination with a negative electrode.

A positive electrode according to the present invention can be prepared by any known method for preparing an electrode, provided that there is used the positive electrode active substance described above. For example, the powder of said active substance may be mixed with a known binding agent such as polyethylene, or may be mixed with a known electric conductive material such as acetylene black. The resultant mixture is subject to compression molding onto a support made of stainless steel or the like, or charged into a metallic vessel, so as to prepare an electrode. An example of such electrode is a pellet electrode. As shown by FIG. 1(b), a pellet electrode structure may be constructed of a pellet electrode 10a, spacer 11a, and a nickel mesh 13. The pellet electrode 10a may be 10 mm in thickness. On the spacer 11a is placed the nickel mesh on which is placed the pellet electrode 10a.

The positive electrode according to the present invention may also be prepared by coating a metallic substrate, such as one made of aluminum, nickel, stainless steel, copper or the like, with a slurry obtained from the above-mentioned powdery mixture dissolved in an organic solvent such as toluene. An example of an electrode prepared by such method is a coat-type electrode. As shown by FIG. 1(c), a coat-type electrode structure may be constructed of a coat-type electrode 10b, a spacer 11b, and a coin-cell vessel (bottom cover) 12. The coat-type electrode may be 10 mm in diameter. The spacer 11b is spot welded with the coat-type electrode 10b on the central upper surface.

A negative electrode (negative electrode active substance) for use in the present invention in combination with the abovementioned positive electrode may be a lithium compound or a lithium alloy.

The negative electrode can be prepared by a known method. For example, it can be made by a method similar to those described in the above with respect to the preparation of the positive electrode. Thus, a negative electrode active substance in powdery form may be admixed with a known binding agent as described and, if necessary, may be admixed with a known conductive material as described. Then, the resultant powdery mixture is formed into a sheet, followed by compressing it onto a conductive mesh (collector) of stainless steel, copper or the like. Alternatively, the powdery mixture may be admixed with an organic solvent to form a slurry, which is then coated on a metallic substrate of copper or the like.

There can be employed other constituent elements which are known for use in nonaqueous electrolyte secondary cells. Examples of these are given below.

An electrolytic solution generally comprises an electrolyte and a solvent. The solvent for the electrolytic solution is not limited so long as it is nonaqueous. Examples for use include carbonates, ethers, ketones, sulfolane compounds, lactones, nitriles, chlorinated hydrocarbons, amines, esters, amides, phosphoric esters and the like. Concrete examples are 1,2-dimethoxyethane, 1,2-diethoxyethane, tetrahydrofuran, 2-methyltetrahydrofuran, ethylene carbonate (EC), vinylene carbonate, methyl formate, dimethyl sulfoxide, propylene carbonate, acetonitrile, γ-butyrolactone, dimethylformamide, dimethyl carbonate (DMC), diethyl carbonate, sulfolane, ethylmethyl carbonate, 1,4-dioxane, 4-methyl-2-pentanone, 1,3-dioxolane, 4-methyl-1,3-dioxolane, diethyl ether. sulfolane, methylsulfolane, propionitrile, benzonitrile, butyronitrile, valeronitrile, 1,2-dichloroethane, trimethyl phosphate, triethylphosphate and the like. One or two or more of these compounds can be used. For example, a combination of dimethyl carbonate (DMC) and ethylene carbonate (EC) can be used.

The electrolyte contained in the electrolytic solution is a substance which carries lithium ions through the solvent so as to make them electrochemically react with the positive electrode active substance and/or the negative electrode active substance. Examples of such electrolyte include $LiClO_4$, $LiPF_6$, $LiCF_3SO_3$, $LiAsF_6$, $LiB(C_6H_5)_4$, $LiCl$, $LiBr$, $CH_3SO_3Li$, $CF_3SO_3Li$, $LiN(SO_2DV_3)_2$, $LiN(SO_2C_2F_5)_2$, $LiC(SO_3CF_3)_3$, $LiN(SO_3CF_3)_2$, and the like, among which $LiPF_6$ may be preferably used.

The nonaqueous electrolyte secondary cell according to the present invention is not limited with respect to structural materials for the separator, cell housing or any other parts, and may be constructed using a variety of materials known in the art. The cell has no restriction in the shape and size, and can take any shape including cylindrical, square-shaped, coin-type or the like.

The present invention will be explained in more detail with reference to Working Examples given below, but these Examples are not for restricting the present invention.

Example 1

Synthesis of Positive Electrode Active Substance Mainly Composed of FeOF by Melt-Quenching Method As the starting materials were used iron oxide $Fe_2O_3$ (Soekawa-rikagaku Co.) and iron fluoride $FeF_3$ (Soekawa-rikagaku Co.). The starting materials were weighed in a glove box so that the molar ratio of $Fe_2O_3$ to $FeF_3$ ($Fe_2O_3:FeF_3$) was 1:2.33 by weight and then admixed sufficiently in an agate mortar. The resultant mixture of the starting materials as precursor was charged into a platinum crucible provided with a bottom hole (50 mm in height, 12 mm in diameter of the hole) to the height of approx. one third from the bottom. The platinum crucible was placed in a quartz tube (about 100 mm in height, about 15 mm in diameter) at a distance of about 1 mm from the inner wall of the tube, and then set up in a single-roll melt-quenching apparatus. The inside of the quartz tube was deserted for about ten minutes to a pressure of $10^{-3}$ torr, and then sealed with argon gas. The induction heating was carried out so that the temperature rose to about 1300° C. in about five seconds, in which the measurement was done by shining light onto the quartz tube through the gaps of the coils wound around the quartz tube longitudinally in a length of 15 mm. This temperature was maintained for about forty seconds. Upon observation that the starting materials were melted and had fallen through the bottom hole, additional argon gas was introduced for about one minute and the melted materials were cast through the bottom hole onto the copper roll rotating at 2000 rpm, so as to obtain samples in the form of vitreous ribbons. The samples thus obtained were pulverized in an agate mortar in a glove box without exposure to air, in order to prepare the desired positive electrode active substance. It was only at the time of setting up the platinum crucible in the single-roll quenching apparatus and recovering the sample that the system was exposed to the air, during the synthesis.

XRD Measurements

<Method>

X-ray diffraction measurement was performed on the sample of the positive electrode active substance using CuKα radiation (with Rigaku TTR III).

<Result>

Figure 2:
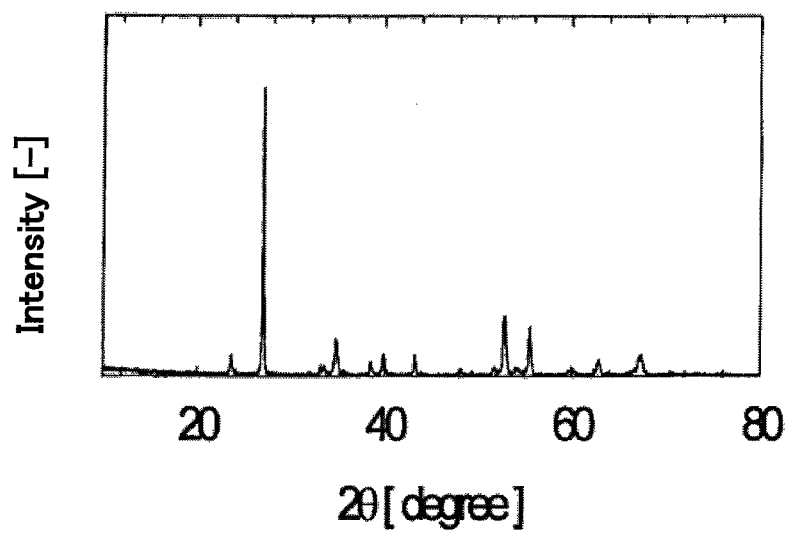
FIG. 2 shows the XRD pattern and the charge-discharge profile of the positive electrode active substance mainly composed of FeOF produced by the present invention in which the starting material molar ratio is $Fe_2O_3:FeF_3=1:2.33$.
Figure 2:
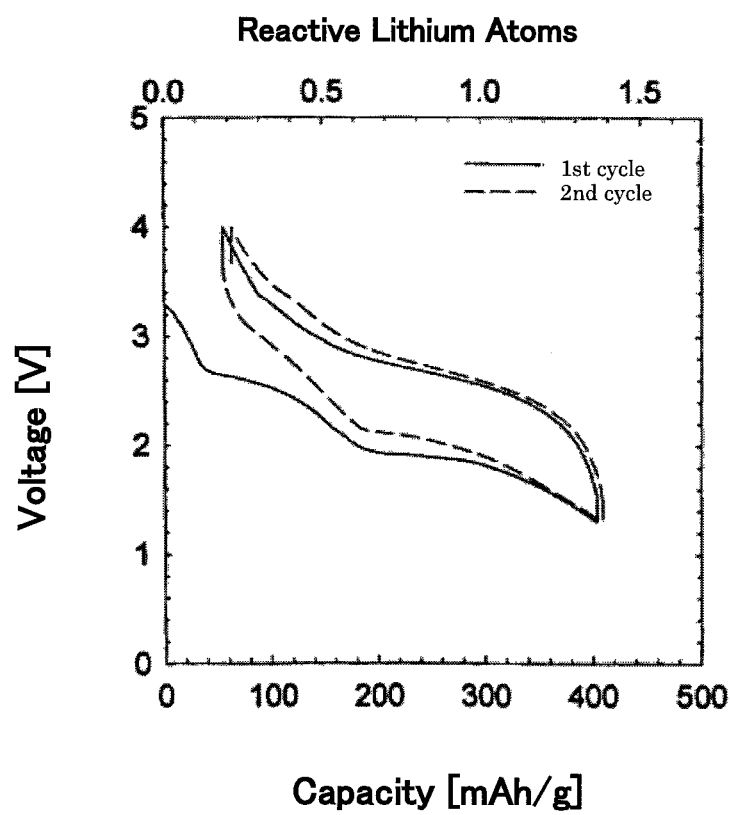

FIG. 2(a) illustrates the result of the XRD measurement. The sample was assigned to FeOF of space group $P4_2/mnm$ (tetragonal rutile structure) as previously reported. It was thus evidenced that FeOF was produced by the melt-quenching method.

Preparation of Electrodes

The sample of the positive electrode active substance FeOF produced by the melt-quenching was pulverized in an agate mortar. A positive electrode was prepared by charging and pelletizing a mixture of FeOF:acetylene black:PTFE (binding agent)=70:25:5 (about 30 mg) in a 10 mm thick disc.

A 2032 type stainless coin cell (20 mm×3.2 mm) was prepared by combining the positive electrode with a negative electrode of lithium metal, in which the electrolytic solution consisted of 1 mol/dm³ of lithium hexafluorophosphate/ethylene carbonate+diemethylcarbonate [$LiPF_6$/EC+DMC (EC:DMC in volume: 1:1)], followed by a charge/discharge test as shown below.

Charge/Discharge Test

The charge/discharge test was conducted in the CCV mode. The measurements were carried out under a current density of 0.2 mA/cm² and a voltage in the range of 1.3 V to 4.0 V, with 1 C rate being defined as the current density when the theoretical one atom of lithium is liberated in the charge/discharge cycles for one hour. The results of the charge/discharge characteristic for the first cycle and the second cycle are shown in FIG. 2(b). It was found that the discharge capacity reached as high as 404 mAh/g.

Figure 3:
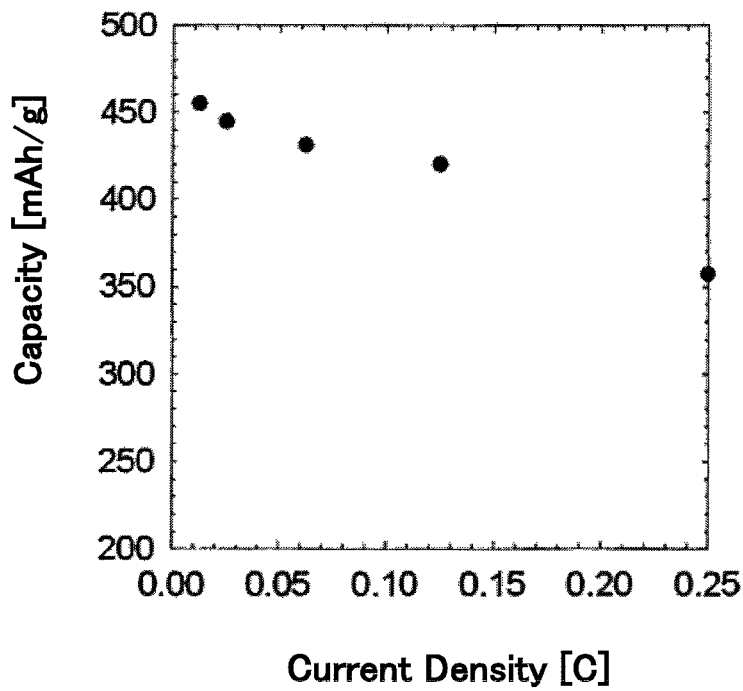
FIG. 3 shows the capacity versus the current density and the capacity versus the cycle number of the positive electrode active substance mainly composed of FeOF produced by the present invention in which the starting material molar ratio is $Fe_2O_3:FeF_3=1:2.33$.
Figure 3:
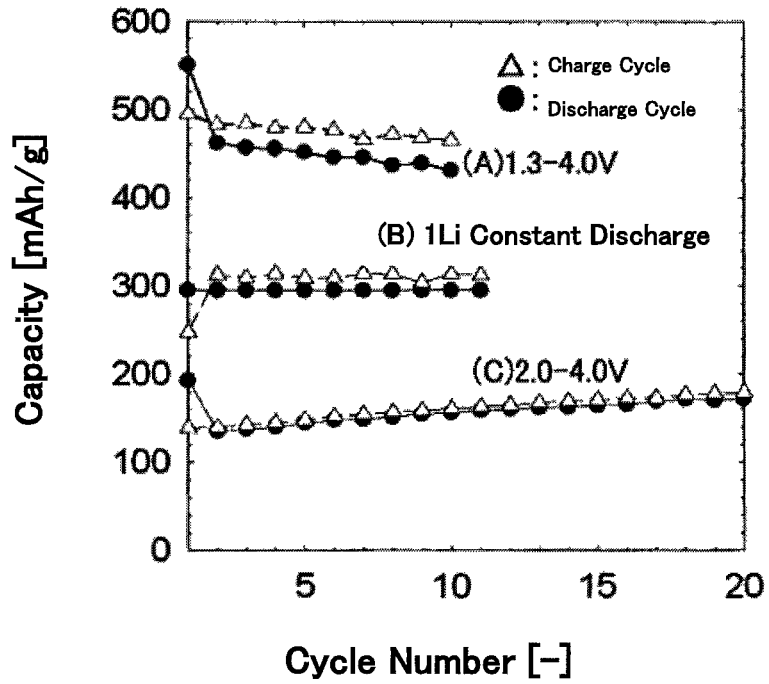

FIG. 3(a) shows the relationship between the current density and the discharge capacity with respect to FeOF versus lithium metal. The figure shows that the capacity was still as high as 350 mAh/g even when the current density was ¼ C (corresponding to a value of 0.25 at the lateral axis). In addition, FIG. 3(b) shows the discharge/charge capacity versus cycle number (as lateral axis) with varied voltages. From the results of the discharge/charge capacity as shown in (A) with the voltage in the range 1.3 to 4.0 V, it was found that the discharge capacity of FeOF was 550 mAh/g, which corresponds to 1.8Li per FeOF, and further that the capacity was as high as 431 mAh/g even after ten cycles. (B) and (C) in FIG. 3(b) show discharge/charge capacities, measured under a constant current of 1Li (60 mA/g with a current density of 0.11 mA/cm²) and under a voltage in the range of 2.0 to 4.0V, respectively. The results demonstrate that the capacity was maintained substantially constant even after ten cycles.

Example 2

Synthesis of Positive Electrode Active Substance Mainly Composed of FeOF from Starting Materials with Varying Ratios Positive electrode active substances were prepared in the same manner as in Example 1 except that the molar ratio of the starting materials was varied. More specifically, positive electrode active substances were prepared in the same manner as in Example 1, at molar ratios of iron oxide $Fe_2O_3$:iron fluoride $FeF_3$=(1:2.13), (1:1.86), (1:5), and (1:10).

In addition, the time for melting was changed to forty-five seconds, differently from Example 1.

Calculation of Composition and Diffraction Peak Height Ratio

<Method for Calculation>

The compositions and the diffraction peak height ratios of the positive electrode active substances thus obtained were calculated based on the X-ray diffraction patterns using CuKα radiation.

More specifically, the compositions (% by weight) of the positive electrode active substances with respect to FeOF and the remainder ($FeF_3$ and $Fe_2O_3$) were calculated based on the ratios of the main peak intensities (peak heights) with respect to FeOF, $FeF_3$ and $Fe_2O_3$, observed in the X-ray diffraction patterns using CuKα ray (cf. Table 1 below).

Calculations were also made on the main peak height ratios of (110) plane to (101) plane of FeOF based on the X-ray diffraction patterns using CuKα radiation (cf. Table 2 below).

Figure 4:
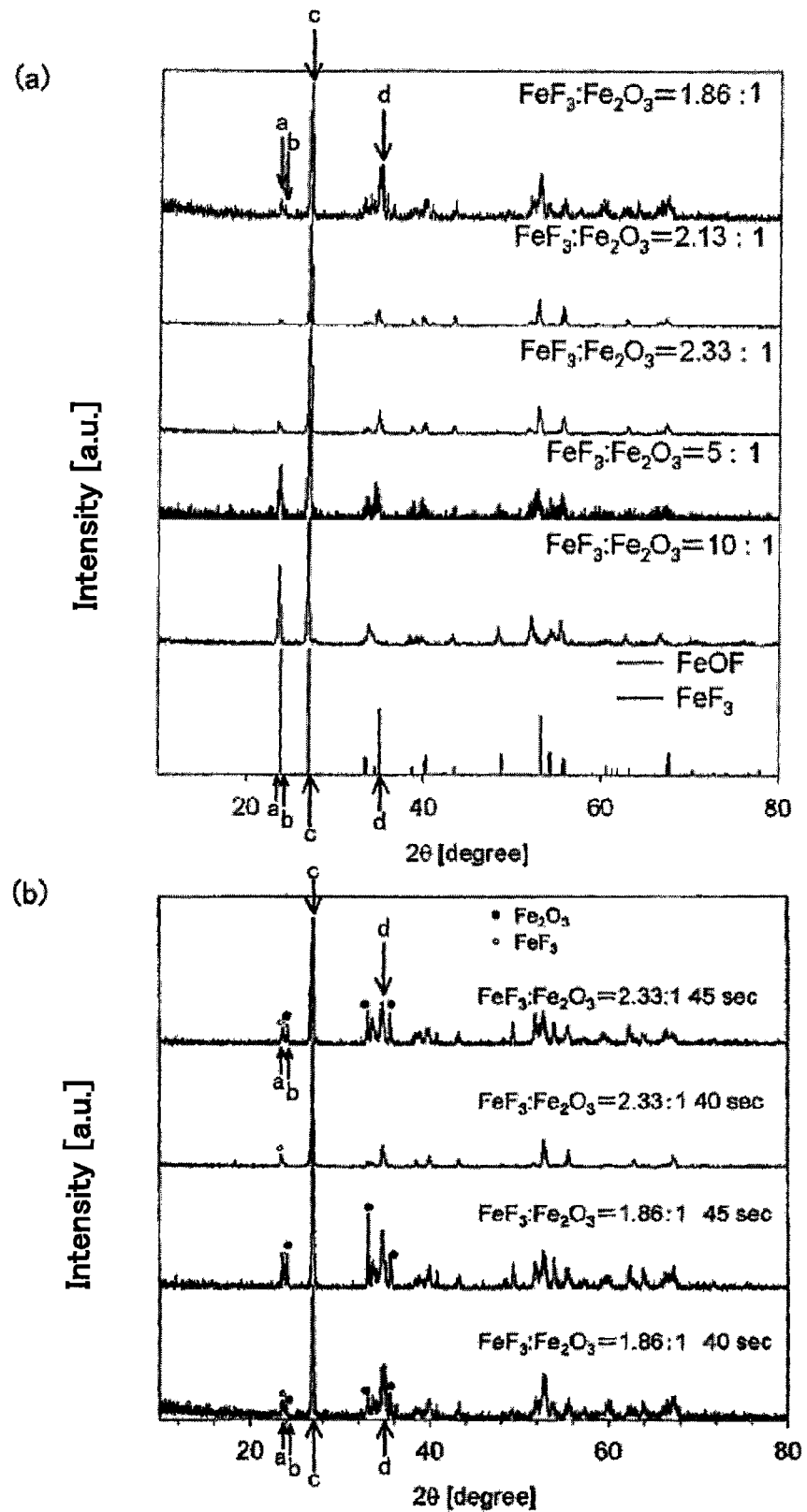
FIG. 4 shows the XRD pattern of the positive electrode active substance mainly composed of FeOF produced by the present invention in which the starting material molar ratio is $Fe_2O_3:FeF_3=1:1.86, 1:2.13, 1:5,$ or $1:10$.

FIG. 4(a) shows XRD patterns (charts) of the abovementioned substances including those of Example 1 in which the starting material ratio of iron oxide $Fe_2O_3$:iron fluoride $FeF_3$=1:2.33. FIG. 4(b) shows XRD patterns (charts) of the positive electrode active substances produced from starting materials with ratio of iron oxide $Fe_2O_3$:iron fluoride $FeF_3$= (1:2.33) and (1:86) under varied melting times, including forty-five seconds.

With respect to 2θ in the lateral axis of the figures, the peak designated by a is the main peak assigned to $FeF_3$, the peak designated by b is the main peak assigned to $Fe_2O_3$, the peak designated by c is the main peak assigned to (110) plane of FeOF, and the peak designated by d is the main peak assigned to (101) plane of FeOF. For example, in the case of the starting material ratio $Fe_2O_3$:$FeF_3$=1:10, it is seen from FIG. 4(a) that the main peak height ratio $FeF_3$:$Fe_2O_3$:FeOF=a:b:c=4:0:6, and hence the calculated composition of the product comes to 60% of FeOF and 40% of $FeF_3$. For the product prepared at the same starting material ratio, it is also found by calculation from FIG. 4(a) that the main peak height ratio FeOF (110): FeOF (101)=5.9:1.

<Results of Calculation>

In the manner described in the above, the compositions (% by weight) of the respective positive electrode active substances were calculated based on the XRD pattern as summarized below.

TABLE 1

| Starting material composition | Product composition (%) | | |
|---|---|---|---|
| ($Fe_2O_3$:$FeF_3$) | $FeF_3$ | $Fe_2O_3$ | FeOF |
| 1:10 | 40 | — | 60 |
| 1:5 | 33 | — | 66 |
| 1:2.33 | 9 | — | 91 |
| 1:2.13 | 4 | — | 96 |
| 1:1.86 | 11 | 11 | 78 |

The results show that presence of $Fe_2O_3$ is observed in the case of the starting material molar ratio iron oxide $Fe_2O_3$:iron fluoride $FeF_3$=1:1.86. In the case where iron fluoride $FeF_3$ exceeds the abovementioned ratio (i.e. iron oxide $Fe_2O_3$:iron fluoride $FeF_3$=1:1.86), no presence of $Fe_2O_3$ is observed in the product. It is therefore considered that iron fluoride $FeF_3$ in an amount exceeding the stoichiometric ratio will prevent iron oxide $Fe_2O_3$ from remaining in the product.

With regard to the respective positive electrode active substances mainly composed of FeOF, the diffraction peak height ratios of (110) plane to (101) plane of FeOF are summarized below.

TABLE 2

| Starting material composition | Diffraction peak height ratio in the product | |
|---|---|---|
| ($Fe_2O_3$:$FeF_3$) | (110) plane | (101) plane |
| 1:10 | 5.9 | 1 |
| 1:5 | 2.8 | 1 |
| 1:2.33 | 7.6 | 1 |
| 1:2.13 | 8.2 | 1 |
| 1:1.86 | 2.6 | 1 |

It is seen from the results above that according to the present invention there can be produced a positive electrode active substance mainly composed of FeOF having a high diffraction peak ratio of (110) plane to (101) plane of FeOF, i.e., of 2 or higher.

It is also seen from FIG. 4(b) that, in the case of the melting time of forty-five seconds, the products tend to include the remaining iron oxide $Fe_2O_3$ from the starting material, which is not the case in Example 1. This suggests that the melting time may more suitably be forty seconds.

Charge/Discharge Test

Charge/discharge tests were carried out for the respective positive electrode active substances in the same manner as in Example 2.

Figure 5:
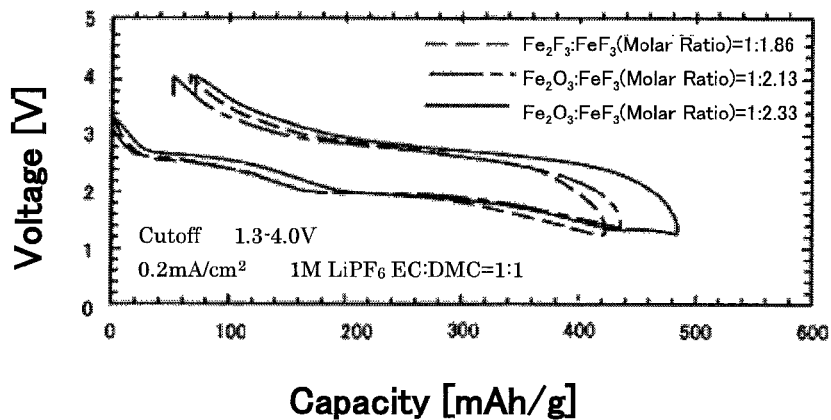
FIG. 5 shows the charge-discharge profile of the positive electrode active substance mainly composed of FeOF produced by the present invention in which the starting material molar ratio is $Fe_2O_3:FeF_3=1:1.86, 1:2.13, 1:2.33$ or $1:10$.
Figure 5:
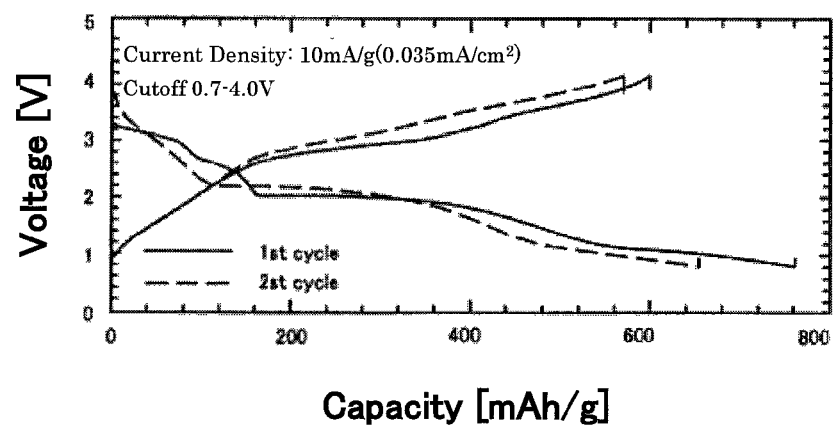
Figure 5:
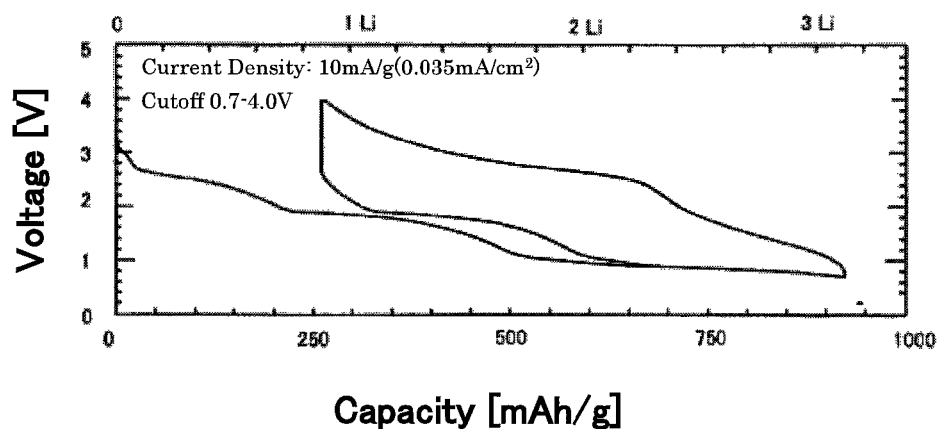

FIG. 5(a) shows charge/discharge profiles between 1.3 V and 4.0 V (0.2 mA/cm², 1M $LiPF_6$, EC:DMC=1:1) with regard to the positive electrode active substances obtained from the starting materials of iron oxide $Fe_2O_3$:iron fluoride $FeF_3$ ratio=(1:1.86), (1:2.13) and (1:2.33). It is seen from the figure that there can be obtained a positive electrode active substance mainly composed of FeOF with excellent quality from any case.

FIG. 5(b) shows charge/discharge profile between 0.7 V and 4.0 V (10 mA/g: 0.035 mA/cm², 1M $LiPF_6$, EC:DMC=1:1), with regard to the positive electrode active substance obtained from the starting materials of iron oxide $F_2O_3$:iron fluoride $FeF_3$ ratio=1:10. The figure shows that the initial discharge capacity reaches as high as about 800 mAh/g, demonstrating that the resultant positive electrode active substance mainly composed of FeOF exhibits excellent quality as a positive electrode for secondary cell. It is particularly to be noted that the charge/discharge profile includes plateau regions at 3.2 V, corresponding to the insertion potential of $FeF_3$, and at 2.5 V, corresponding to the insertion potential of FeOF. This suggests that there is obtained a unique positive electrode active substance integrating $FeF_3$ characteristics and FeOF characteristics, which may not have been possible up to now.

Among the positive electrode active substances shown in FIG. 5(a), those produced from the starting material of ratio of iron oxide $Fe_2O_3$:iron fluoride $FeF_3$=1:2.33, between 0.7 V and 4.0 V (10 mA/g: 0.035 mA/cm², 1M $PF_6$, EC:DMC=1:1) were subjected to a further charge/discharge test, the results of which are shown in FIG. 5(c). It is seen from FIG. 5(c) that there is obtained a surprisingly excellent charge/discharge characteristic, especially in that the initial discharge capacity is as high as 900 mAh/g (almost equivalent to the theoretical capacity), which is even superior to the substance shown by FIG. 5(b) (the substance produced from the starting material of ratio of iron oxide $Fe_2O_3$:iron fluoride $FeF_3$=1:10).

Thus, it is appreciated that the positive electrode active substance mainly composed of FeOF with the remainder being iron fluoride $FeF_3$ and/or iron oxide $Fe_2O_3$ according to the present invention exhibits extremely excellent cell properties.

NUMERAL SYMBOLS

1: Quartz tube
2: Crucible with a bottom hole
3: Copper wire
4: Copper roll

What is claimed is:

1. A method of producing a positive electrode active substance comprising mainly FeOF, which comprises the steps of admixing iron oxide $Fe_2O_3$ and iron fluoride $FeF_3$ both in solid states, and melt-quenching the mixture in an atmosphere of inert gas, wherein in the melt-quenching, the iron oxide is melted, and the molten mixture is quenched.

2. The method of producing the positive electrode active substance as claimed in claim 1, wherein the melt-quenching is carried out by high-frequency induction heating and roll quenching, and wherein the molar ratio of iron fluoride $FeF_3$ to iron oxide $Fe_2O_3$ is not less than 1 and not more than 10.

3. A positive electrode active substance consisting of 50% to 99% by weight of FeOF with a remainder being only iron fluoride $FeF_3$.

4. A positive electrode active substance consisting of 50% to 99% by weight of FeOF with a remainder being iron fluoride $FeF_3$ and/or iron oxide $Fe_2O_3$, and wherein the FeOF has a lattice constant c=3.09-3.14 Å with tetragonal rutile structure.

5. The positive electrode active substance as claimed in claim 4, wherein the substance consists of 50% to 99% by weight of FeOF with the remainder being only iron fluoride $FeF_3$.

6. The positive electrode active substance as claimed in claim 3, wherein, when measured by X-ray diffraction method using CuKα radiation, the diffraction peak height ratio of (110) plane to (101) plane of FeOF is not less than 2.6.

7. The positive electrode active substance as claimed in claim 4, wherein, when measured by X-ray diffraction method using CuKα radiation, the diffraction peak height ratio of (110) plane to (101) plane of FeOF is not less than 2.6.

8. The method of producing the positive electrode active substance as claimed in claim 2 wherein the substance is not less than 60% by weight FeOF.

9. The method of producing the positive electrode active substance as claimed in claim 2, wherein a molar ratio of iron fluoride $FeF_3$: iron oxide $Fe_2O_3$ in the admixture exceeds 1.86:1.

10. A positive electrode active substance produced by the method of claim 1.

11. An electrode comprising the positive electrode active substance of claim 10.

* * * * *

UNITED STATES PATENT AND TRADEMARK OFFICE
CERTIFICATE OF CORRECTION

| | | |
|---|---|---|
| PATENT NO. | : 9,312,538 B2 | Page 1 of 1 |
| APPLICATION NO. | : 14/128470 | |
| DATED | : April 12, 2016 | |
| INVENTOR(S) | : Okada et al. | |

It is certified that error appears in the above-identified patent and that said Letters Patent is hereby corrected as shown below:

On the title page, item (54), Delete "METHOD FOR PRODUCING IRON OXYFLUORIDE POSITIVE ELECTRODE ACTIVE SUBSTANCE AND IRON OXYFLUORIDE POSITIVE ELECTRODE ACTIVE SUBSTANCE" and insert --OXYFLUORIDE-BASED POSITIVE ELECTRODE ACTIVE SUBSTANCES AND METHODS FOR PRODUCING THE SAME--.

In the specification

Column 1, lines 1-5, delete "METHOD FOR PRODUCING IRON OXYFLUORIDE POSITIVE ELECTRODE ACTIVE SUBSTANCE AND IRON OXYFLUORIDE POSITIVE ELECTRODE ACIVE SUBSTANCE" and insert --OXYFLUORIDE-BASED POSITIVE ELECTRODE ACTIVE SUBSTANCES AND METHODS FOR PRODUCING THE SAME--.

Signed and Sealed this
Twelfth Day of July, 2016

Michelle K. Lee
*Director of the United States Patent and Trademark Office*